Nov. 30, 1926. 1,608,867
C. J. SPITZLEY ET AL
HYDROCARBON BURNER
Filed Jan. 21, 1924  2 Sheets-Sheet 2
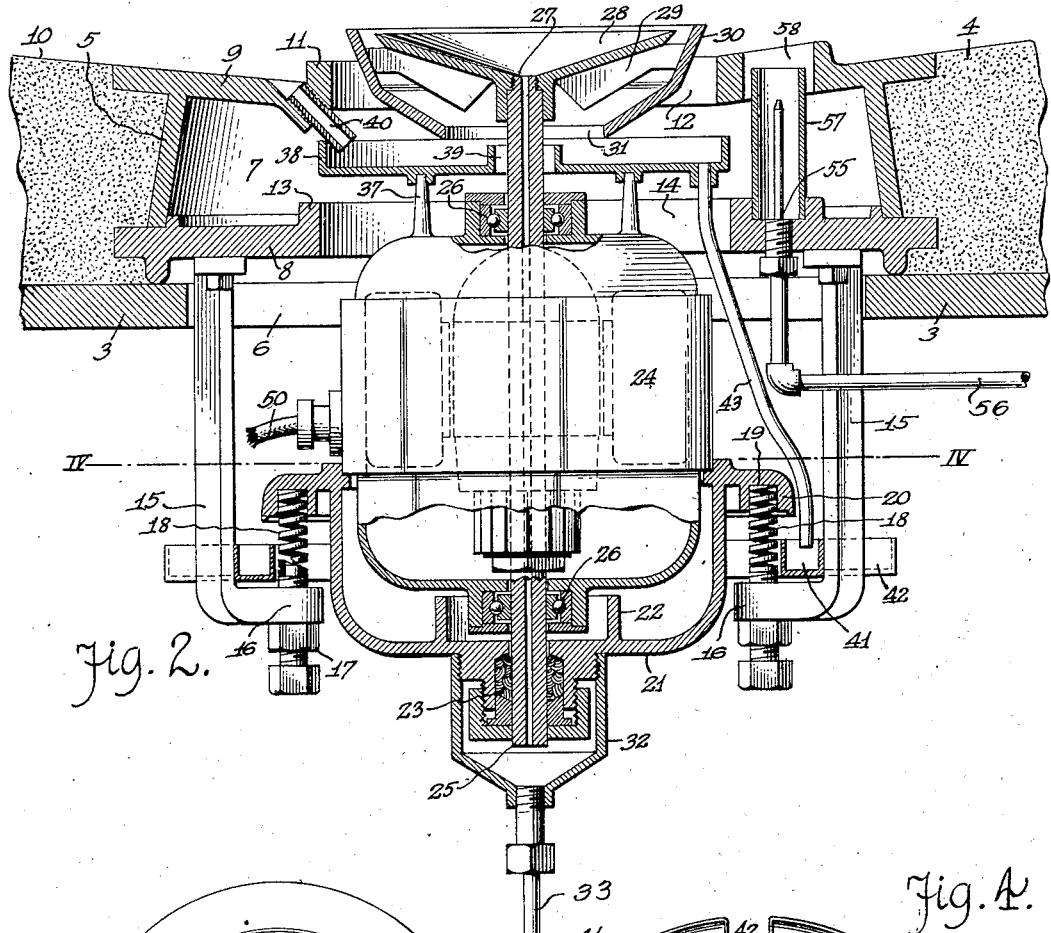
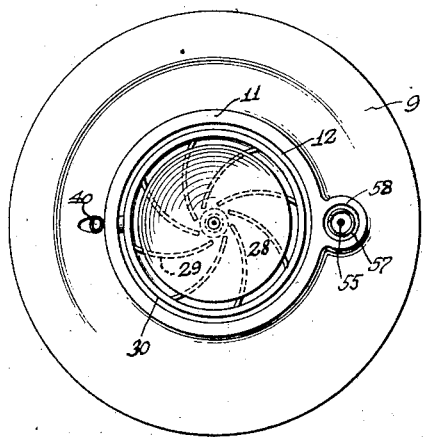
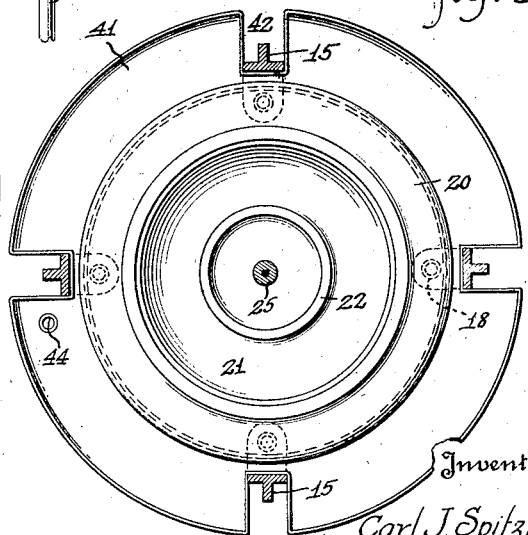
Inventors
Carl J. Spitzley,
John D. Howe,
By
Attorneys

Patented Nov. 30, 1926.

1,608,867

UNITED STATES PATENT OFFICE.

CARL J. SPITZLEY, OF DETROIT, AND JOHN D. HOWE, OF RIVER ROUGE, MICHIGAN.

HYDROCARBON BURNER.

Application filed January 21, 1924. Serial No. 687,425.

This invention relates to a hydro-carbon burner of that type wherein crude oil or other liquid hydrocarbon fuel may be atomized and mixed with air to insure complete combustion. Such hydro-carbon burners may be advantageously used in connection with furnaces of various types and many kinds of heating apparatus.

Our invention aims, in its broadest aspect, to provide fuel atomizing means including a centrifugal fuel distributing head or member supplied with fuel axially of a motor or other power device employed for driving the distributing head, and provision is made in connection with said head whereby it performs the office of a suction fan and supplies air under pressure to the fuel, so that the air and fuel may intimately commingle and insure an admixture or gas which, when ignited will sustain combustion in a more efficacious manner and with better results than is possible by using the fuel alone.

Our invention further aims to provide a motor driven fuel spraying and air mixing chamber apparatus wherein novel means is employed for preventing any liquid fuel from interfering with the operation of the motor, there being shields or collecting basins for all parts of the burner apparatus so that any unburned oil may be utilized as a means of controlling the operation of the burner, thus precluding any danger of the burner operating for any period of time without the atomized fuel being ignited. Such is a safety factor preventing the escape of gas or a flood of liquid fuel.

Our invention further aims to provide a motor driven fuel atomizing device which may be mounted in a furnace or other heating apparatus and supported therein so that vibrations incident to the operation of the device will not be transmitted to the furnace structure to eventually cause open joints or displacement of parts of the furnace.

Our invention will be hereinafter described and then claimed, and reference will now be had to the drawings, wherein Figure 1 is a vertical sectional view of a portion of a furnace or heating apparatus provided with a burner in accordance with our invention;

Fig. 2 is an enlarged vertical sectional view of the hydro-carbon burner;

Fig. 3 is a plan of the upper end of the burner, and

Fig. 4 is a horizontal sectional view taken on the line IV—IV of Fig. 2, showing one of the oil collecting basins.

Figure 1:
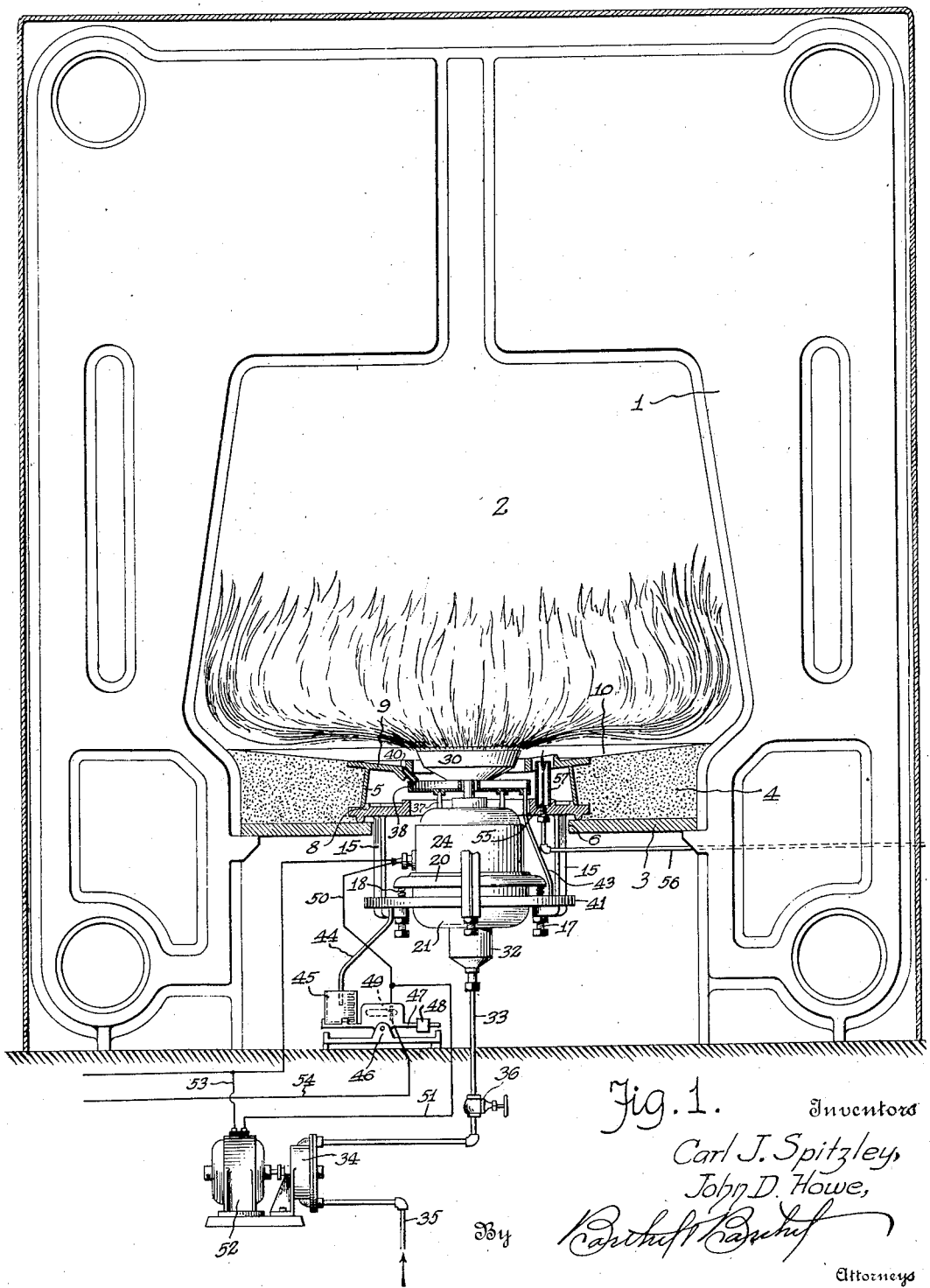

In the drawings 1 denotes, by the way of an example, a portion of a furnace that may be composed of a plurality of hollow water holding units affording a combustion chamber 2 and in the bottom of this combustion chamber is placed a supporting plate 3 for a heat insulating body 4, preferably made of refractory material. The insulator 4 has a central opening 5 coaxially of an opening 6 in the plate 3 and mounted in the opening 5 is a two part or sectional burner housing 7 including a bottom wall 8 and a top wall 9. The bottom wall 8 is adapted to rest on the plate 3 and the top wall 9 is dished or somewhat concave with its upper face flush with the upper concave face 10 of the insulator 4 so that any oil on the insulator may drain on to the top wall 9 about an upstanding flange or wall 11 providing a central opening 14. The bottom wall 8 has an upstanding flange 13 providing a central opening 14 and the openings 12 and 14 substantially aline.

Depending from the bottom wall 8 of the burner housing and extending through the opening 6 are a plurality of equally spaced hangers 15 having inturned ends 16 provided with nut equipped screw bolts 17 adapted to be locked in adjusted positions relative to the hangers. On the upper ends of the screw bolts 17 are coiled cushion springs 18 which extend into sockets 19 provided therefore in a liquid shedding flange 20 of a motor support 21, which is somewhat cup shaped, and has its lower end provided with an annular shield 22 and a stuffing box 23.

Seated in the upper end of the motor support 21 is a conventional form of electric motor 24 provided with an elongated hollow or tubular armature shaft 25 journaled in anti-frictional bearings 26 and adapted to have liquid fuel pass therethrough. The upper end of the tubular armature shaft terminates in a nipple 27 and detachably mounted upon said nipple is an atomizing head comprising an inverted conical shaped distributor 28 having its outer walls connected by a plurality of vanes 29 to an annular shell 30 which has its upper open end substantially flush with the upper edges of the distributor 28. The lower end of the shell 30 is open, as at 31 so that air may be drawn into said shell by the vanes 29 when the distributor 28 is revolved by the motor 24. The vanes are preferably curved and tangentially disposed about the axis of the atomizing head and are adapted to forcibly discharge air from the shell 30 to commingle with the spray of fuel from the distributor 28. The dished configuration of the distributor 28 is such that centrifugal force will discharge the fuel outwardly at an acute angle to the horizontal and such annular spray will be across the discharge of air from the shell 30 because the walls of this shell are at an obtuse angle relative to the horizontal and will insure a commingling of the atomized fuel and air for combustion purposes. The atomizing head is located in the opening 12 of the burner housing and receives air from said housing admitted thereto by the opening 14 in the bottom wall of the housing.

Liquid fuel is supplied to the tubular armature shaft 25 from a cap 32 screwed on the stuffing box 23 and communicating with a pipe 33 extending to a rotary pump 34 which receives oil from a supply pipe 35. Oil may flow to the pump 34 by gravity or said pump may be utilized for lifting the oil and forcibly supplying it to the armature shaft. A control valve 36 may be located on the pipe 33.

On top of the electric motor 24 are pegs or legs 37 supporting a basin or pan 38 having a central flanged opening 39 providing clearance for the upper end of the armature shaft 25. The basin 38 is below the opening 12 of the top wall 9 and extending into said basin is a drain tube 40 carried by the top wall 9 adjacent the upstanding wall 11, so that any oil accumulating on the insulator or the burner housing may drain into the basin or pan 38.

Supported on the hangers 15 is another basin or pan 41 of greater area than the basin 38 so as to receive any oil drippings from the opening 6 of the plate 3 or parts within or above the opening 6. The large basin or pan 41 is raised, as at 42, to provide clearance for the hangers 15, and extending into the large basin is a drain tube or pipe 43 carried by the upper small basin 38. Another drain tube or pipe 44 extends from the large basin 41 into a receptacle 45 forming part of an automatic switch which may be conveniently located in the furnace below the plate 3. The switch includes a suitable base 46 on which is fulcrumed a support 47 provided with a receptacle 45 and a suitable counterbalance 48 therefor. On the support 47 is a conventional mercury switch 49 electrically connected to the motor 24 by a wire 50 and by another wire 51 to an electric motor 52 adapted to operate the rotary pump 34. The motors 24 and 52 are connected by wires 53 to one side of a suitable source of electrical energy, as an ordinary electric lighting circuit, and the opposite side of the source of electrical energy is connected by a wire 54 to the switch 49. This switch is normally closed so that the motor driven pump 34 and the motor 24 may operate in synchronism, but when a quantity of oil accumulates in the receptacle 45 the weight of the oil causes the support 47 to be overbalanced whereby the switch 49 is opened thus breaking the electrical circuit for the motors 24 and 52 causing a cessation in the supply of oil to the atomizing head and operation of said head.

On the bottom wall 8 of the burner housing is a pilot burner 55 connected to a gas supply pipe 56, said pilot burner including a burner tube 57 extending into an opening 58 provided therefor in the top wall 9 of the burner housing. With this pilot burner in operation any atomized oil will be ignited with the oil burning in a large circular flame of high caloric intensity within the combustion chamber 2, as shown in Fig. 1. Should the motors 24 and 52 be started to place the burner in operation, when the pilot burner is out, the accumulation of oil draining into the basins 38 and 41 will soon cause the receptacle 45 to receive sufficient oil to overbalance the support 47 and cause opening of the switch 49. It will therefore be impossible for any large quantity of oil to be wasted or formed as a body in the furnace to cause back fire or a conflagration.

It is by virtue of the valve 36 that the supply of oil through the hollow armature shaft to the centrifugal distributor 28 may be regulated to insure a proper delivery to the distributor whereby centrifugal force may cause fuel to be disseminated and atomized.

It is thought that the operation and utility of our hydrocarbon burner will be apparent without further description and while in the drawings there is illustrated a preferred embodiment of our invention, it is to be understood that various kinds of thermostats, regulators and controlling devices may be used in connection with the burner, and that the structural elements are susceptible to such changes as are permissible by the appended claims.

What we claim is:

1. In an oil burner, an electric motor, a tubular armature shaft for said motor adapted to have oil pass therethrough, an oil distributing member carried by said armature shaft and adapted to distribute oil by centrifugal force, vanes carried by said distributing member, a shell connecting said vanes and cooperating therewith in forcing air against the fuel distributor by said distributing member, said shell having its upper edge in a plane above said distributing member and adapted to collect any liquid fuel thrown off by said distributing member, and a basin below the lower end of said shell and above said motor.

2. An oil burner as called for in claim 1, and hangers supporting said motor relative to said burner housing and a second basin surrounding said motor and supported by said hangers.

3. An oil burner comprising a housing adapted to have oil drained towards the center thereof, an electric motor, hangers supported from said housing and supporting said electric motor, an oil atomizing head driven by said motor, a drain basin supported by said motor and adapted to receive oil from the top of said burner housing, and a drain basin about said motor supported by said hangers and adapted to receive oil from the first mentioned basin.

In testimony whereof we affix our signatures.

CARL J. SPITZLEY.
JOHN D. HOWE.